Figure 1:
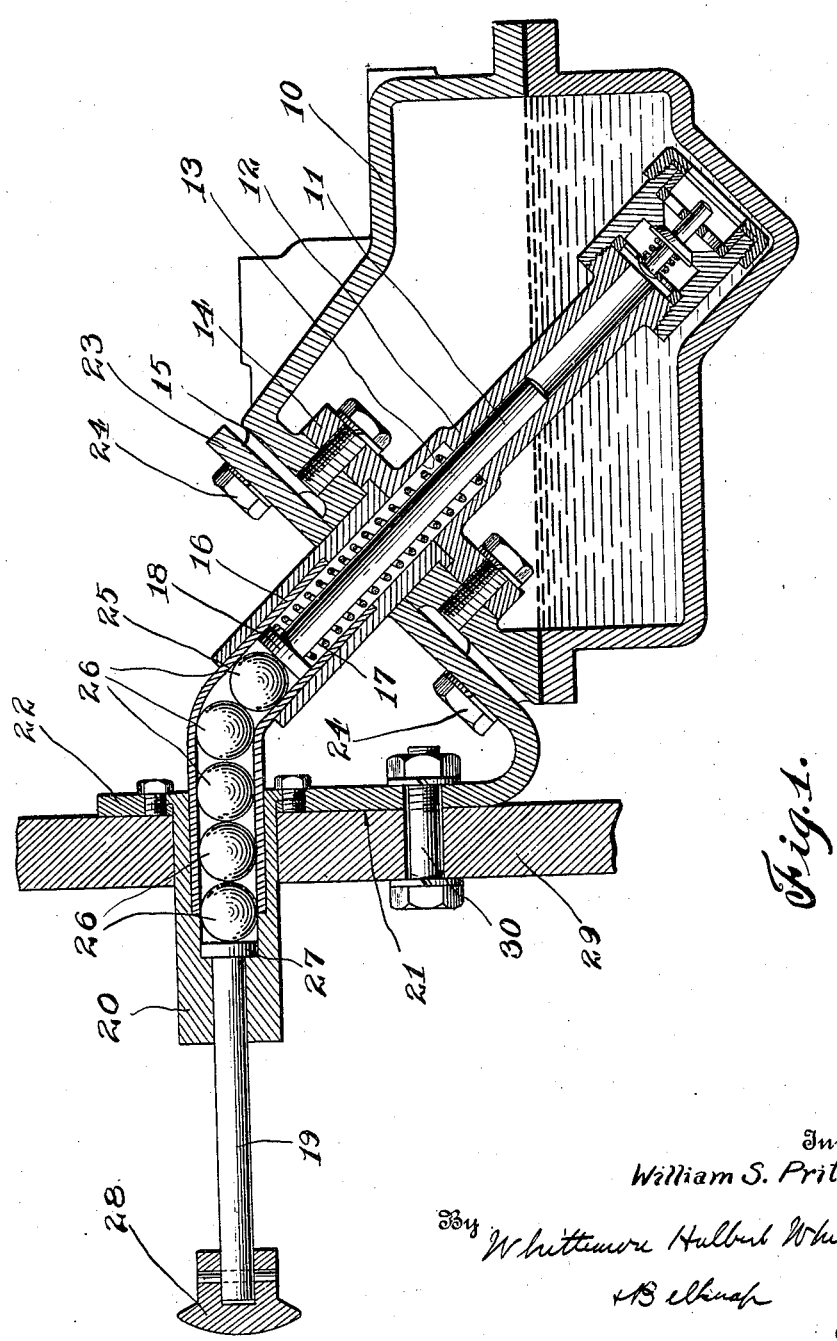

Nov. 19, 1929.  W. S. PRITCHARD  1,736,050
ACTUATOR
Filed Feb. 7, 1927  2 Sheets-Sheet 1

Inventor
William S. Pritchard
By Whittemore Hulbert Whittemore
+Belknap
Attorney's

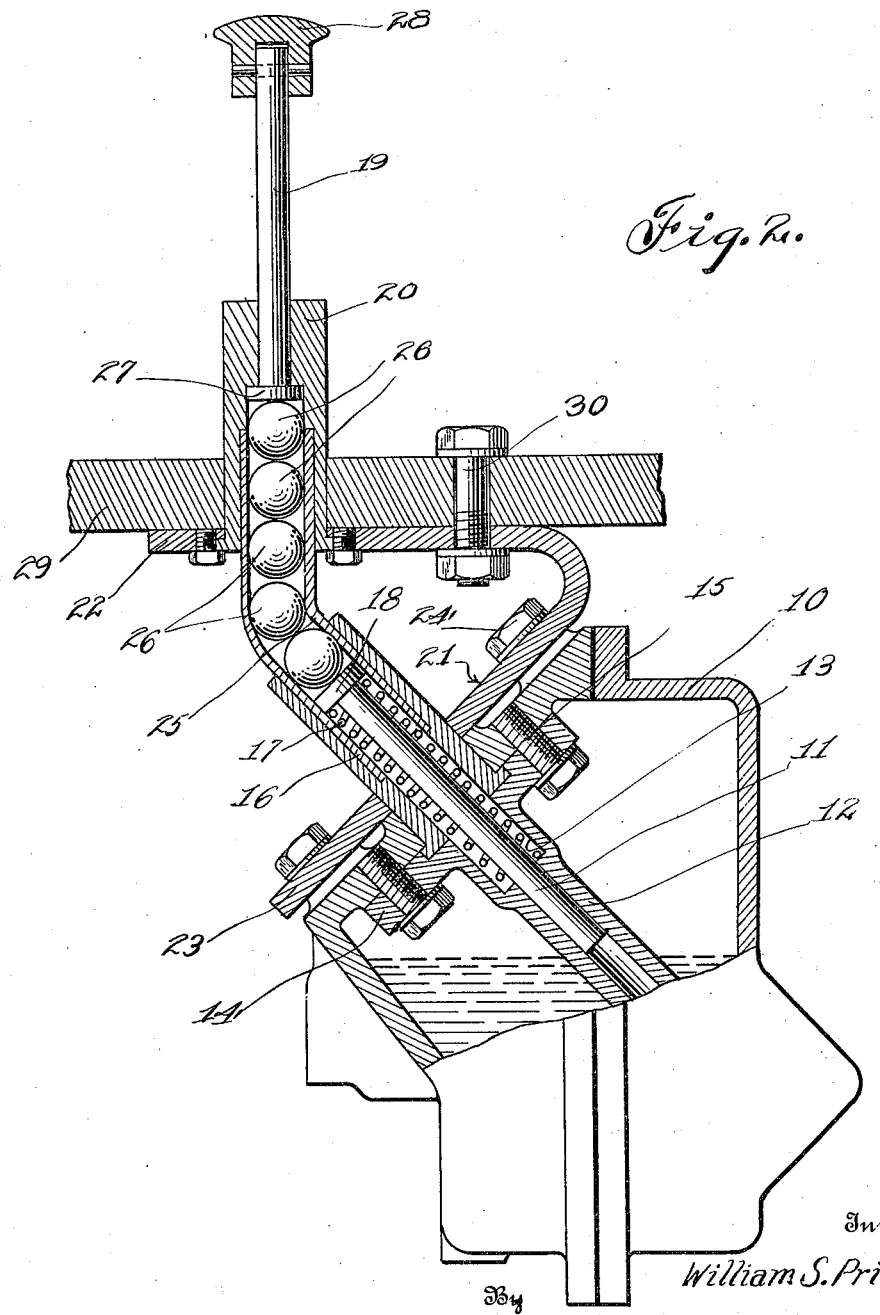

Patented Nov. 19, 1929

1,736,050

UNITED STATES PATENT OFFICE

WILLIAM S. PRITCHARD, OF DETROIT, MICHIGAN, ASSIGNOR TO MOTOR PRODUCTS CORPORATION, OF DETROIT, MICHIGAN, A CORPORATION OF NEW YORK

ACTUATOR

Application filed February 7, 1927. Serial No. 166,573.

This invention relates to actuators and more particularly to plunger shafts wherein the power receiving end and the power delivering end are arranged out of alignment or at an angle to one another with means for transmitting the movement of one to the other of the plunger parts.

The invention has as one of its objects to provide a simple, compact and efficient means for operatively connecting two plungers arranged out of alignment or at an angle to one another so that a reciprocation of one causes a reciprocation of the other. In carrying the invention into execution I provide an angular or curved guide extending from the end of one plunger to the adjacent end of the other and within this guide I arrange a plurality of filler elements in successive contacting relation and in contact with the said ends of the plungers. As a consequence of this the operation of one plunger will cause a longitudinal displacement of the plurality of elements within the angular guide to thus cause a corresponding movement of the other plunger. The invention finds utility in connection with devices wherein it is necessary, expedient or desirable to arrange the operating means in one plane or angle and the part to be operated in another plane or angle. This construction may be used to particular advantage in connection, for instance, with automobile lubricating systems wherein a lubricant container is provided with a plunger extending exteriorly thereof and operable for forcing the lubricant from within the container through the delivery conduits to the bearings or other points of distribution. In order to avoid the necessity of a stuffing box at the point in which the plunger passes out of the container it is necessary that the plunger emerge from the container at a point adjacent the top thereof and that the level of the lubricant be below this point. However, inasmuch as it is oftimes necessary or desirable to arrange the operating plunger in a substantially horizontal plane some connection capable of transmitting the reciprocable movement of the horizontal plunger to the substantially vertically arranged pump plunger must be provided and it is in this connection that this invention finds particular utility and is illustrated in the accompanying drawings.

The present invention also contemplates the provision of an adaptor plate providing means for mounting and supporting the plungers in relative angular relation to one another and the apparatus to be operated in relation to the power delivering plunger. By means of this adaptor plate it is possible to maintain the plunger and the apparatus to be operated in their relative positions irrespective of whether the operating plunger is disposed horizontally or vertically.

The advantages, utility and novel details of construction of an embodiment of my invention will be made more apparent as this description proceeds, especially when considered in connection with the accompanying drawings wherein:

Figure 1 is a vertical sectional view through a lubricant pump showing my invention associated therewith, and Figure 2 is a view similar to Figure 1 showing the plunger in a vertical position and further illustrating the utility of the adaptor plate.

While the invention should not be considered as limited in any respect to use solely in connection with a lubricant pump, nevertheless, this invention finds particular utility in connection with the lubricant pump illustrated and described in detail in my co-pending application, Serial No. 135,611, filed September 15, 1926. For the purpose of illustrating the advantages obtainable from the use of this invention in connection with such a type of pump I have herein illustrated the same as including a casing 10 designed to contain lubricant adapted to be forced therefrom under pressure by means of a plunger 11 reciprocable within a sleeve-like housing 12 mounted within the casing 10. The housing 12 is herein illustrated as arranged at an angle with the plunger 11 emerging from the casing 10 at a point above the level of the lubricant. With such an arrangement the necessity for a stuffing box to seal the opening through which the plunger 11 moves is eliminated.

The housing 12 has the bore thereof slightly enlarged at its upper end as indicated at 13 and is provided with a flange 14 through which bolts 15 pass for securing this housing to the casing 10. Extending outwardly is a sleeve 16 the bore of which coincides with the enlarged bore 13 of housing 12 to provide a spring compartment within which a spring 17 is arranged. This spring engages on the one hand in the bottom of the enlarged bore 13 and on the other hand against a head 18 provided on plunger 11. This spring is to normally urge plunger 11 in an upward direction.

Operating plunger 19 is reciprocably mounted in a sleeve-like support or housing 20 carried by an adaptor 21. This adaptor, in the embodiment of the invention herein illustrated, is substantially V-shaped in cross section with one leg 22 thereof acting as a support for the housing 20 while the other leg 23 thereof is secured, as for instance, by means of bolts 24 to the pump casing 10. As a consequence the adaptor 21, in the position of the parts illustrated in Figure 1, supports operating plunger 19 in a substantially horizontal position and pump plunger 11 in a relative angular position and also acts as a support for the pump casing 10.

The sleeve 16 is recessed at one end to receive a tubular guide 25, the other end of which is sleeved within the support 20. Arranged within the guide 25 is a plurality of spherical elements or balls 26 and designed to fill the space between the ends of the plungers 11 and 19 with one of the balls at one end in engagement with the head 18 of plunger 11 and the ball at the other end in engagement with the head 27 of the plunger 19. The balls are of non-compressible material and fill the space both transversely and longitudinally of the guide 25. As a consequence pressure upon the knob 28 of the plunger 19 will cause the balls 26 to be moved longitudinally of guide 25 and cause a corresponding movement to be imparted to plunger 11. This movement of the latter plunger is against the action of spring 17 so that when pressure is relieved from plunger 19 spring 17 will return the parts to the position illustrated in Figure 1 wherein further movement is limited by the engagement of head 27 against the end of the enlarged bore in the supporting member 20.

With this construction it is possible to operate the pump plunger 11 by means of an operating plunger arranged out of alignment or at an angle thereto.

In Figure 1 the reference character 29 indicates a vertical portion of a motor vehicle such, for instance, as the dash board or instrument board and by securing the leg 22 of the adaptor plate 21 to the automobile part 29, as for instance, by means of bolt 30 the plunger 19 for the pump plunger may be arranged in a position convenient to the operator of the vehicle.

By comparing Figure 1 with Figure 2 it will be noted that in the latter figure the position of the adaptor plate 21 has been reversed so that plunger 19 is arranged in a vertical position and extends upwardly through the floor board 31. In some types of vehicles it will be found necessary or expedient to operate the pump from the floor board and with the present invention the adaptor plate 21 provides means for maintaining the relative position between the parts and at the same time provide means for mounting the parts either upon the dash board or floor board of the vehicle.

While the angular power transmitting shaft is illustrated as employed in connection with a pair of reciprocating plungers it may obviously be employed with equal facility in other connections wherein it is desired to transmit movement from one part to another arranged either out of alignment or at an angle to one another. As a consequence, reservation is made to make such changes in the invention as may come within the purview of the accompanying claims.

What I claim as my invention is:—

1. In combination a pump casing, a pump plunger projecting outwardly from the said casing, an adaptor plate supporting the said pump casing, an operating plunger arranged at an angle to the pump plunger, a housing for the operating plunger carried by the said adaptor plate, a guide having one end sleeved within the pump plunger housing and means within the said guide for transmitting the movement of the operating plunger to the pump plunger.

2. In combination a pump casing and a pump plunger projecting upwardly therefrom at an angle to the horizontal, a substantially horizontally arranged operating plunger, a housing for the operating plunger, an adaptor plate shaped to support the operating plunger housing in fixed angular relation to the said pump plunger, and means for transmitting the movement of the operating plunger to the said pump plunger.

3. In combination a pump casing, a pump plunger projecting upwardly from the said casing at an angle to the horizontal, a housing for the said pump plunger, an adaptor plate supporting the pump casing and having a portion surrounding the said pump plunger housing, a substantially horizontally arranged operating plunger, a housing for the operating plunger, the said adaptor plate having a portion supporting the said operating plunger housing, a guide sleeved at one end in the operating plunger housing and at its other end in the pump plunger housing, and a plurality of spherical members within the said guide for transmitting the movement of the operating plunger to the said pump plunger.

In testimony whereof I affix my signature.

WILLIAM S. PRITCHARD.